United States Patent
Ma

(10) Patent No.: US 9,531,997 B2
(45) Date of Patent: *Dec. 27, 2016

(54) METHOD FOR LIVE VIDEO CHAT

(71) Applicant: Shenzhen Seefaa Scitech Co., Ltd., Shenzhen (CN)

(72) Inventor: Zhigang Ma, Northville, MI (US)

(73) Assignee: SHENZHEN SEEFAA SCITECH CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/924,673

(22) Filed: Oct. 27, 2015

(65) Prior Publication Data

US 2016/0050392 A1    Feb. 18, 2016

Related U.S. Application Data

(63) Continuation of application No. 14/201,735, filed on Mar. 7, 2014, now Pat. No. 9,219,881.

(51) Int. Cl.
| | | |
|---|---|---|
| H04N 7/14 | (2006.01) | |
| H04N 7/15 | (2006.01) | |
| H04L 29/06 | (2006.01) | |
| H04L 12/18 | (2006.01) | |
| H04L 29/08 | (2006.01) | |
| H04L 12/58 | (2006.01) | |

(52) U.S. Cl.
CPC .......... *H04N 7/147* (2013.01); *H04L 12/1813* (2013.01); *H04L 12/1822* (2013.01); *H04L 51/32* (2013.01); *H04L 65/403* (2013.01); *H04L 67/18* (2013.01); *H04N 7/15* (2013.01); *H04N 7/152* (2013.01); *H04L 51/04* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,963,246 A | * | 10/1999 | Kato | H04N 7/152 348/14.01 |
| 6,330,022 B1 | * | 12/2001 | Seligmann | H04N 7/147 348/14.08 |
| 6,704,769 B1 | * | 3/2004 | Comstock | H04N 7/147 348/E7.081 |
| 7,477,282 B2 | * | 1/2009 | Firestone | H04L 12/1822 348/14.08 |
| 7,836,163 B2 | * | 11/2010 | Salesky | G06F 3/1415 709/204 |
| 8,477,662 B2 | * | 7/2013 | Schneider | H04N 7/15 348/14.08 |
| 2002/0126201 A1 | * | 9/2002 | Schmitt | H04N 7/152 348/14.09 |
| 2007/0064901 A1 | * | 3/2007 | Baird | H04N 7/15 379/202.01 |
| 2007/0285506 A1 | * | 12/2007 | Schneider | H04N 7/15 348/14.08 |

(Continued)

*Primary Examiner* — Saket K Daftuar
(74) *Attorney, Agent, or Firm* — Hemisphere Law, PLLC

(57) ABSTRACT

A method is described for bridging a live video chat between two terminals, and then terminating the live video chat after a short period of time has elapsed since the live video chat, in order to reduce the pressure and fear of the parties in the live video chat. Certain attributes for the users of the terminals are calculated.

16 Claims, 9 Drawing Sheets

(56) References Cited

U.S. PATENT DOCUMENTS

| | | | |
|---|---|---|---|
| 2010/0157016 A1* | 6/2010 | Sylvain | H04N 7/15 |
| | | | 348/14.08 |
| 2011/0279634 A1* | 11/2011 | Periyannan | H04N 7/141 |
| | | | 348/14.09 |
| 2014/0195675 A1* | 7/2014 | Silver | H04L 65/1083 |
| | | | 709/224 |
| 2014/0267574 A1* | 9/2014 | Schneider | H04N 7/152 |
| | | | 348/14.09 |
| 2015/0127340 A1* | 5/2015 | Epshteyn | G10L 15/26 |
| | | | 704/235 |

* cited by examiner

METHOD FOR LIVE VIDEO CHAT

CROSS-REFERENCE TO RELATED APPLICATIONS

This application is a continuation of U.S. patent application Ser. No. 14/201,735, titled "DEVICE AND METHOD FOR LIVE VIDEO CHAT," and filed on Mar. 7, 2014, the content of which is incorporated herein by reference.

BACKGROUND OF THE INVENTION

1. Field of the Invention

The disclosure relates to social networking technology and, particularly, to a device and a method using live video chat in social networking.

2. Description of Related Art

Social networking sites are ubiquitous and popular. People get to know each other on those websites by text chatting, exchanging photos, and videos. However, using those common ways of making friends with strangers requires much efforts and time on each other before they become friends, and thus limiting numbers of strangers one can socialize with.

To address the issue, a creative way of employing live video chat is needed such that friend-making among strangers can be fun, quick and less stressful.

BRIEF DESCRIPTION OF THE SEVERAL VIEWS OF THE DRAWING(S)

The foregoing and other exemplary purposes, aspects and advantages of the present invention will be better understood in principle from the following detailed description of one or more exemplary embodiments of the invention with reference to the drawings, in which.

DETAILED DESCRIPTION OF THE INVENTION

The invention will now be described in detail through several embodiments with reference to the accompanying drawings.

In general, the word "module", as used herein, refers to logic embodied in hardware or firmware, or to a collection of software instructions, written in a programming language, such as, Java, C, Objective-C, or assembly. One or more software instructions in the modules may be embedded in firmware, such as EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
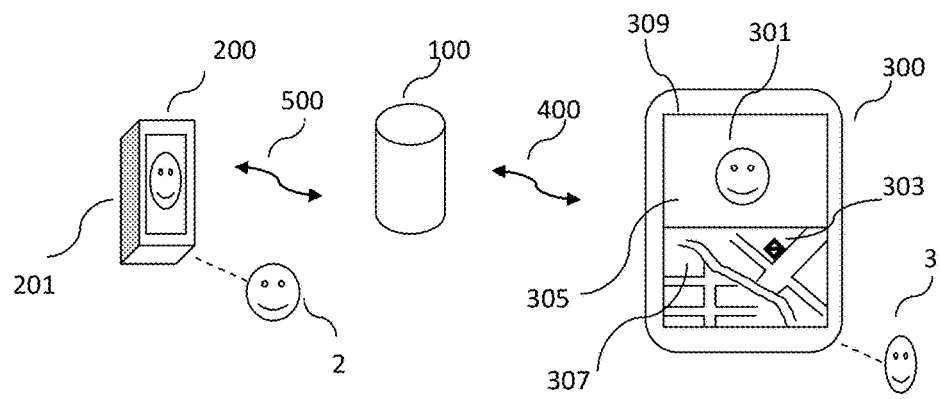
FIG. 1 is a schematic diagram showing a overall exemplary working relationship among a device and two terminals which are connected with the device for live video chat.

Referring to FIG. 1, an overall architecture of live video chat system are illustrated by its principle, in accordance with an embodiment. A device 100, functioning as a server device, is connected to a number of terminals, being either mobile devices, such as smartphones, or other kinds of devices, such as PCs. The connections 400 and 500 can be wired or wireless, using various protocols, such as HTTP protocol, real time messaging protocol (RTMP), real time streaming protocol (RTSP), etc., running through the Internet, or local area networks. or combination of both. Here, two terminals 200, and 300 are used as exemplary terminals to illustrate the principles of the invention. A user 2 of terminal 200 can conduct live video chat with a user 3 of terminal 300, via device 100.

Figure 2:
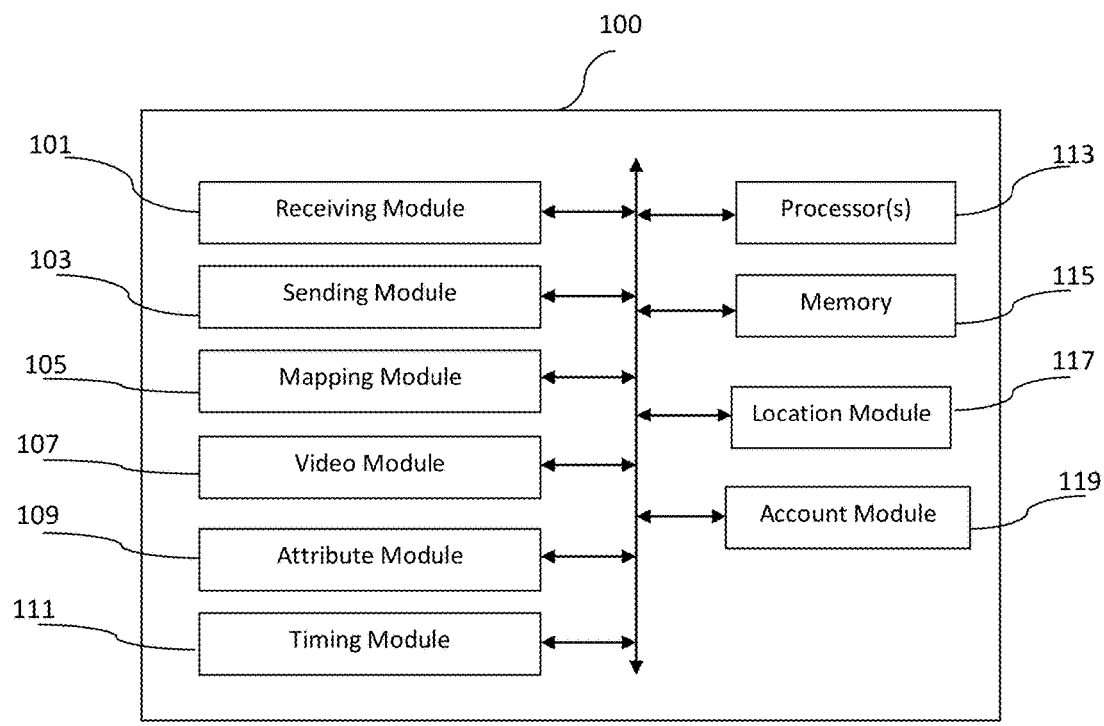
FIG. 2 is a block diagram showing functional blocks for the device of FIG. 1, in accordance with an embodiment.

FIG. 2 shows functional modules and components the device 100 has. In one embodiment, device 100 can have:

1. a receiving module 101 to receive requests from the terminals 200 and 300, such as functioning as an event listener to listen on a certain port to receive request for conducting a live video communication, receive video streams using video stream frameworks, such as, ADOBE MEDIA SERVER, RED 5 MEDIA SERVER, and/or APACHE FLEX, etc., to get location information and other information from the terminals 200 and 300;
2. a sending module 103 to transmit communication to the terminals 200, 300, such as sending live video streams;
3. a mapping module 105 to create and render a map in the terminals 200 and 300, using location information got from the terminal 200 or 300, tag the location into existing maps, alternatively, the mapping module 105 may just provide tagging information based on the location information, and the terminals 200 and 300 may acquires basic mapping directly from a map server (not shown);
5. a video module 107 to process video data received from the terminals 200 and 300, it may buffer, encode and decode according various video stream protocols, such as HTTP streaming, RTMP, RTSP, etc., and prepare the live video objects as needed to facilitate the video communications between the terminals 200 and 300;
4. an attribute module 109 for recording and calculating various communications data between the terminals

200 and 300 to get various characteristics of the user 2 and 3, or their attributes as a user of the live video chat, it can use logging schemes to record usage data, or combining logging with database;

5. a timing module 111 to function as timer for stopping certain events or triggering certain events. e.g., stopping an on-going live video chat session;
6. one or more processors 113, to execute and control the modules to perform their respective tasks;
7. a memory 115 to store the instructions of the modules to be executed by the processor 113;
8. a location module 117 to prepare the location information received from the terminals 200 and 300 into certain formats, such as converting received position coordinates into ordinary, human-readable address, such as using geo-coding services, for instance, the one from GOOGLE; and
9. an account module 119 to maintain profiles for the users of the terminals, including user ID, age, sex, geographical area, etc. for users 2, 3.

Figure 3:
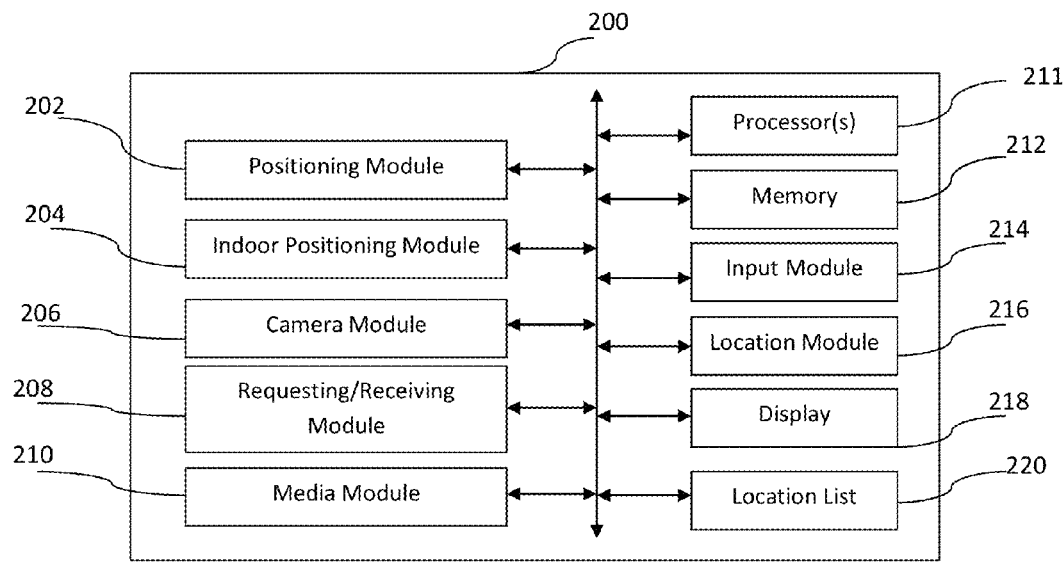
FIG. 3 is a block diagram showing functional blocks for one of the two terminals of FIG. 1, in accordance with an embodiment.
Figure 4:
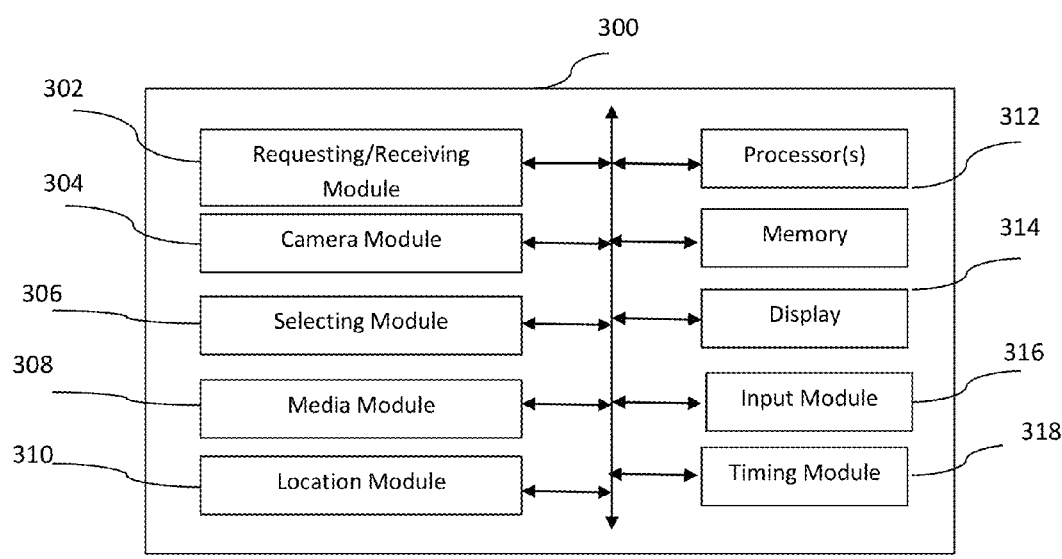
FIG. 4 is a block diagram showing functional blocks for the other one of the two terminals of FIG. 1, in accordance with an embodiment.

FIGS. 3 and 4 show exemplary functional blocks for the terminals 200 and 300. Although some blocks of the terminal 200 are different from some for the terminal 300, however, all blocks in FIGS. 3 and 4 can be all contained in each terminal 200 or 300, and some of them can be distributed as a single application for each terminal 200 and 300. Such that, the terminal 200 can also function as the terminal 300, and vice versa.

In FIG. 3, the terminal 200 has the following modules, according to an embodiment:

1. a positioning module 202 to acquire position information, such as coordinates from an positioning unit, such as a GPS device (not shown) for the terminal 200. The positioning module 202 is to acquire positioning coordinates to be transmitted to the device 100 for displaying the location of the terminal 200 for the terminal 300;
2. a indoor positioning module 204 for getting indoor positioning information from indoor positioning devices (not shown) when the terminal 200 is in an indoor environment, especially when the indoor position information can be translated into a format understandable by the device 100 and the terminal 300, this information will provide more accurate location of the terminal 200;
3. a camera module 206 for shooting video of the user 2 of the terminal 200 for video chat, or shooting other videos;
4. a requesting/receiving module 208 to communicate with the device 100, e.g., to send availableness report, or to send/receive live video stream;
5. a media module 210 to prepare video, audio streams for live video chat;
6. a processor(s) 211 to execute all the modules in the terminal 200;
7. memory 212 to store all instructions for the modules;
8. an input module 214 to receive input from the user 2 to operate the terminal 200;
9. a location module 216 to prepare location information of the terminal 200 to send to the device 100, where the location module can take data from the positioning module 202, and the indoor positioning module 204, or alternatively, can set a specific location selected from a location list 220 that is stored in the memory 212, or takes input from the input module 214 by the user 2; and
10. a display 218, which is controlled by the processor 211 to show user interfaces, and live video chat screens.

FIG. 4 shows functional blocks for the terminal 300, in accordance with one embodiment. It contains a selecting module 306 for selecting the terminal 200, based on its locations and/or availableness to communicate with, and a timing module 318 to time the duration of various on-going events, such as the live video chat between the terminals 200 and 300. Modules, 302, 304, 308, 310, 316 are the same or similar to those in FIG. 3, in terms of structures and functionalities. The terminal 300 also has a processor(s) 312 to execute the modules, and a display 316 to user interfaces, and live video chat screens.

The principles of the live video chat using the device 100 and the terminals 200 and 300 are illustrated by the following flowcharts together with some schematic diagrams, based on exemplary embodiments. The flowcharts show only exemplary tasks in embodiments to describe the principles of the methods, and the order of the tasks is not necessarily fixed as shown, might be altered, and certain steps might be omitted without departing from the principles of the invention.

Figure 5:
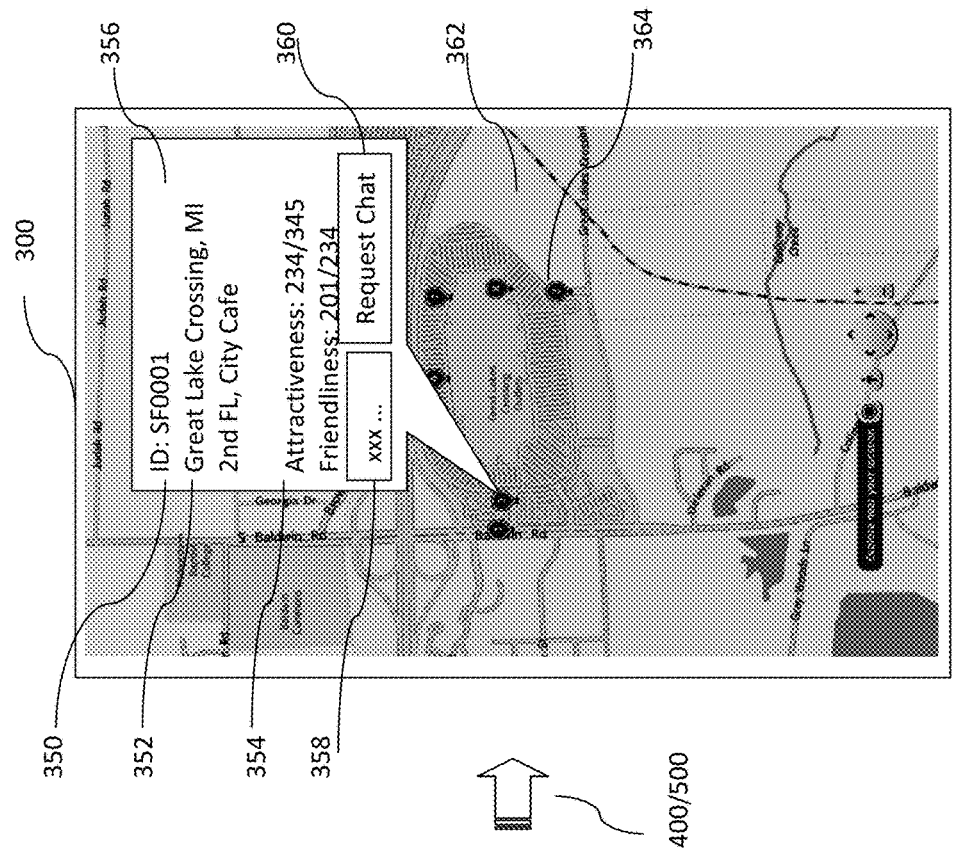
FIG. 5 is a schematic diagram showing both user interfaces, according to one embodiment, of the two terminals of FIG. 1, when both terminals are in process of starting a live video chat.
Figure 5:
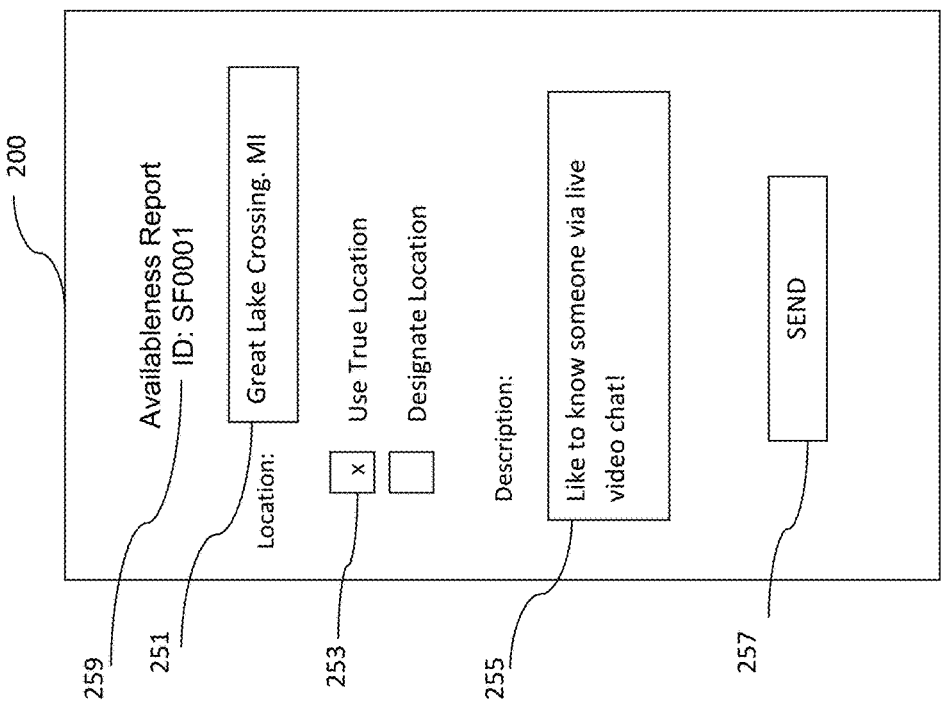
Figure 8A:
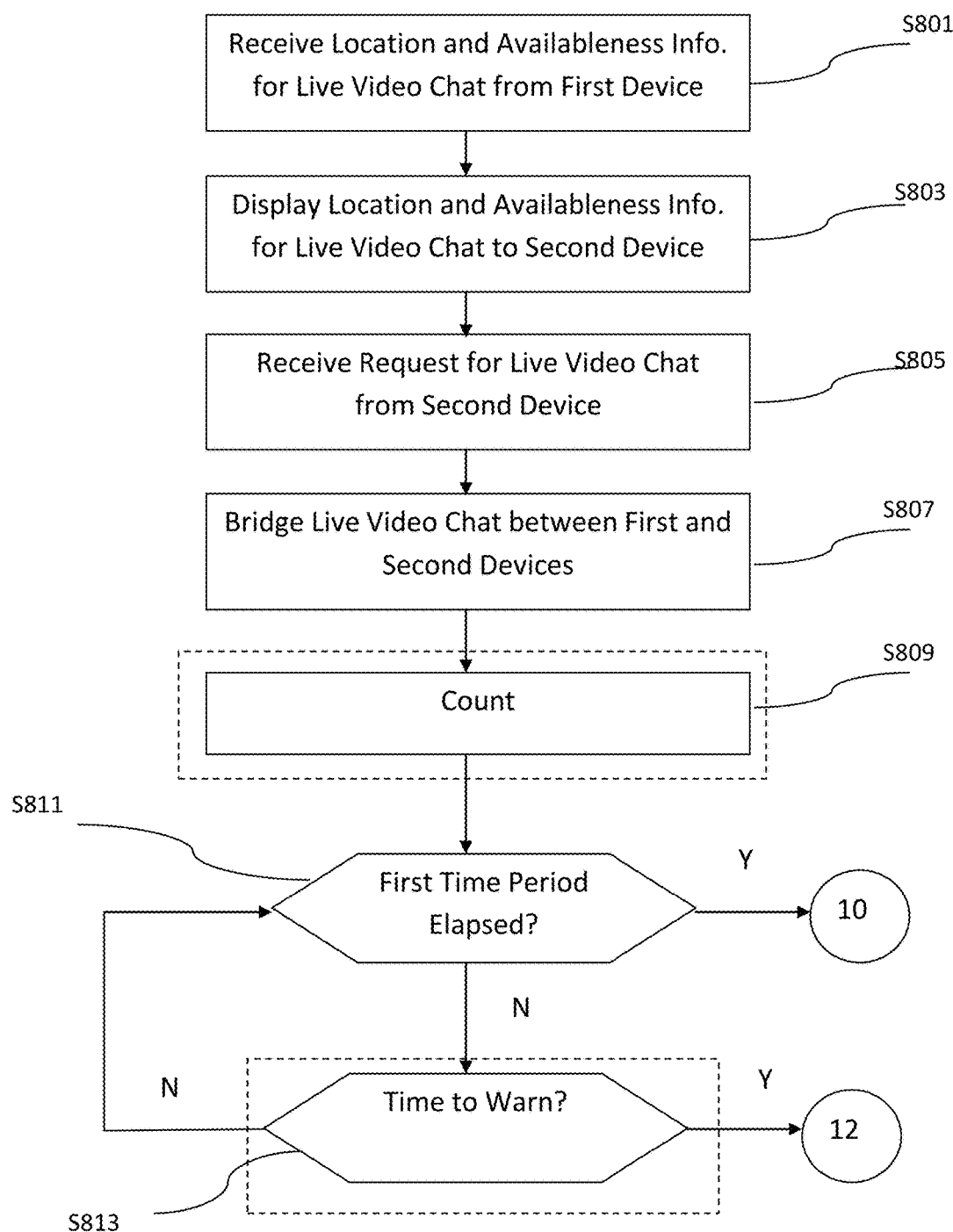
FIGS. 8A-8B are flowcharts illustrating a process in the device of FIG. 1. of conducting a first live video chat between the two terminals of FIG. 1, according to an embodiment.
Figure 8B:
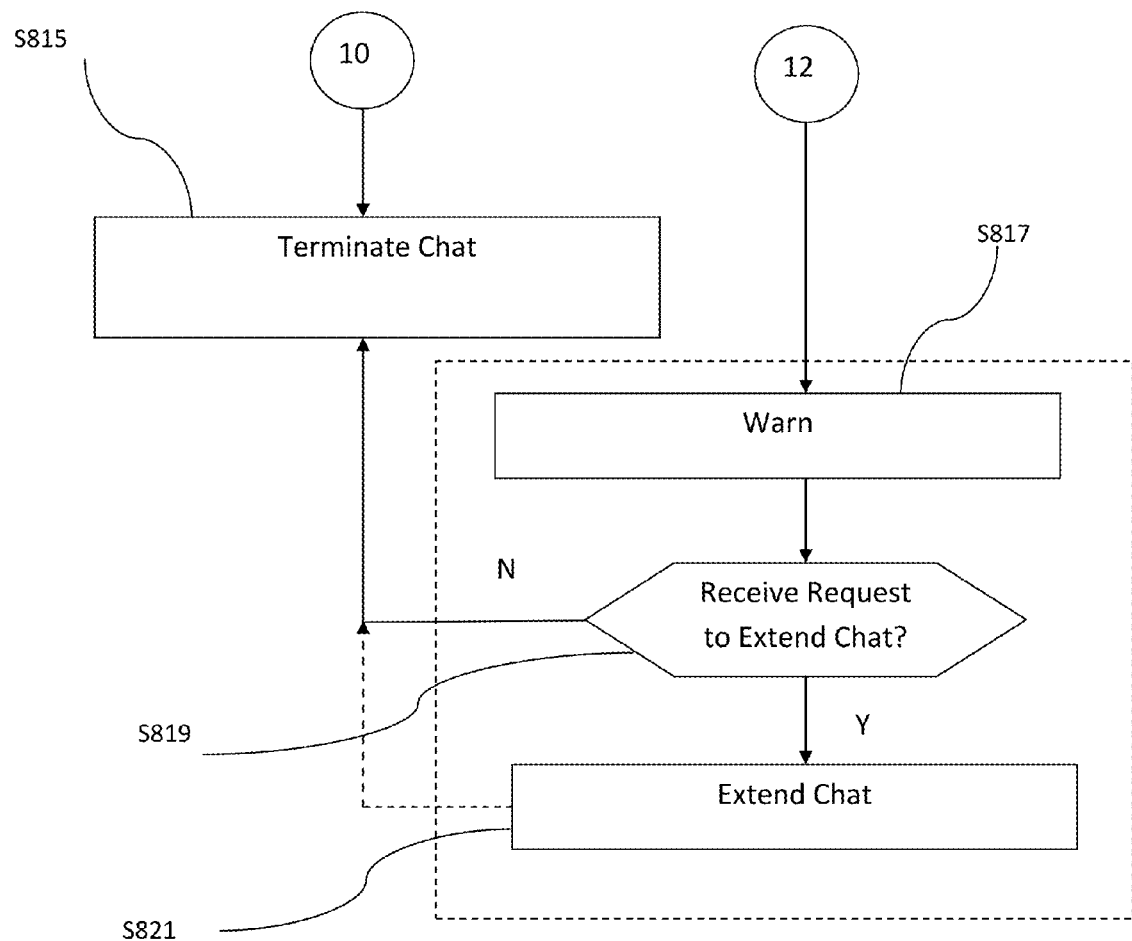

Referring to FIGS. 8A and 8B, in task S801 the receiving module 101 receives the availableness and location information from the terminal 200 that the terminal 200 (or the user 2) is ready to has a live video chat. The available information may be prepared by a user interface as depicted by FIG. 5, on the left, the display 218 shows a screen for the user 2 to fill out, it is showing the user ID 259 ("SF0001") for example, registered with the device 100, and a location box 251 for the user to enter the location he desires others to see, or optionally he can use the real positioning coordinates, by selecting options 253, or choose to use a pre-set list of addresses from the location list 220. The list 220 may look like:

Time Square, NYC, 40°45′23″N 73°59′11″W
Grand Central, NYC, 40°45′10.08″N 73°58′35.48″W ···

Figure 10:
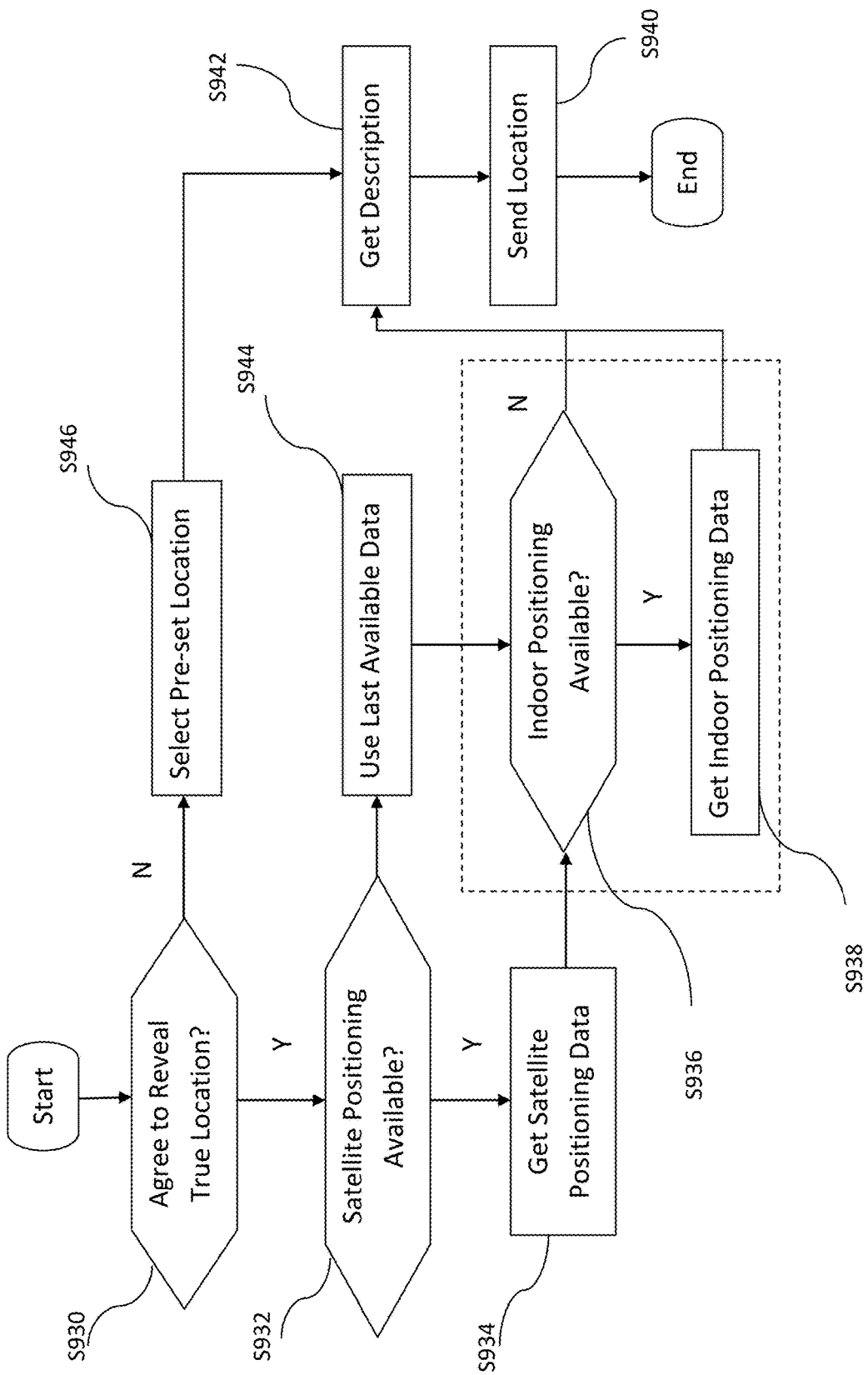
FIG. 10 is a flowchart showing how location information is set by one of the two terminals of FIG. 1, based on an embodiment.

By using the list 220, the user 2 does not have to reveal his real location, especially when he is at home. By using options 253, the process of setting location can be done as shown in FIG. 10. In task 930, if the user agrees to reveal his real location, then the positioning module 202 will try to get positioning coordinates from outdoor positioning systems, e.g., satellite signals, such GPS signals if they are available in tasks 932 and 934, however, if outdoor signals are not available, then the terminal 200 will try to get last saved position coordinates, for example, the set of date saved just before entering a building. Furthermore, as an option, if indoor position information is available, the indoor positioning module 204 will try get indoor position information from the indoor. If the user wants to use the pre-set location list 220, then, in tasks 946, he can select one from the location list 220. Finally, in task 942, the user 2 can choose to enter description of location in box 251 of FIG. 5, and in task 940, the location module 216 can prepare the location information, and then the requesting/sending module 208 sends the data to the device 100 with the user 2 click button 257 of FIG. 5. optionally, the user 2 can also add comments in a box 255 to further describe his situation for being available to have a live video chat.

Going back to FIG. 8A, in task S803, the location module 117 processes the location data received from the terminal 200, and the account module 119 process the user ID to retrieve necessary profile about the user 2. The sending module 103 then sends the data to the terminal 300 to display the availableness and the location of the terminal 200 on the display 314. The format of displaying can vary, it can be in a vertical listing format by listing all available terminals with location information, and/or user profiles, or displaying the data on a map, like the map 307 in FIG. 1 with pinpoint 303, in another format, or in a map 362 in FIG. 5, on the right, with pinpoints 364. To be specific, the mapping module 105 will combine the position coordinates and a relevant map (e.g., map tiles) from a map database (not shown) and tag or mark the map by marking location and other information for the terminal 200. Alternatively, the device 100 can just provide location information and relevant date, except the map tiles that would be provided by the terminal 300 itself, and the terminal 300 will combine the data with the map and display them.

In task S805, the terminal 300 may has a user interface like the one shown in the right part of FIG. 5, on its display 314, the user interface may have a map 362 displaying pinpoints 364 of available terminals for live video chat, including the terminal 200. In case the user 3 selects the terminal 200, a popup window 356 might show information regarding the terminal 200, such as the user ID 350 (same as the user ID 259) of the user 2, and location 352 (same as the location 251/253) which may also includes indoor location, if available. Additional description 358 can also be provided, taken from the description 255 from the terminal 200. The user 3 may trigger request to have a live video chat with the user 2 of the terminal 200 by clicking button 360.

Figure 6:
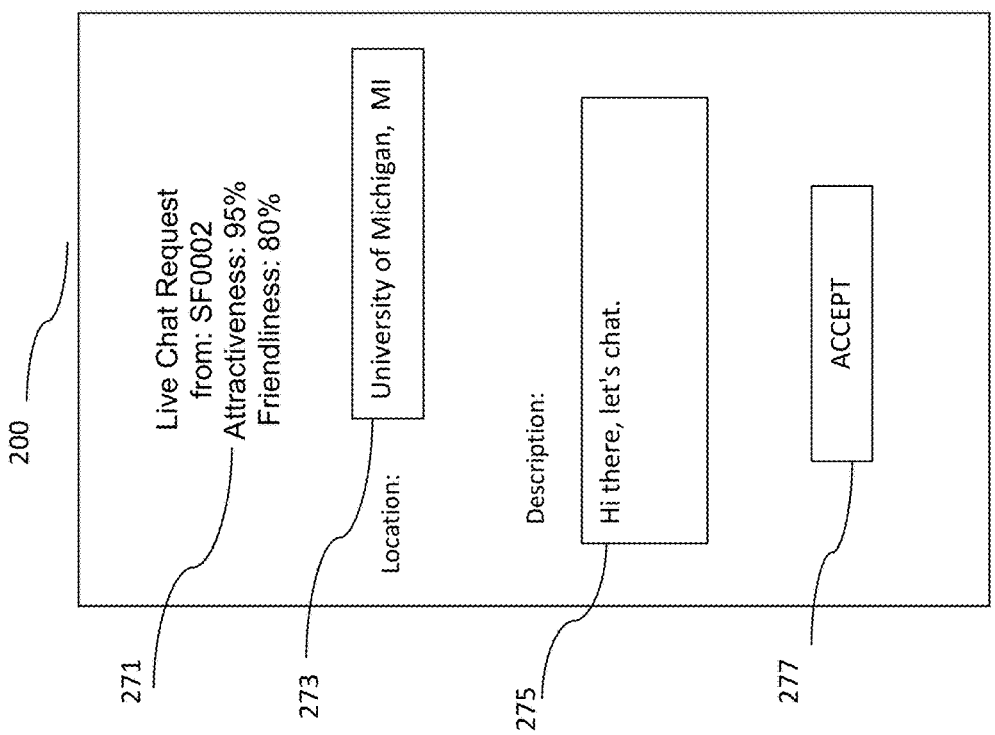
FIG. 6 is a schematic diagram showing a user interface of one of the two terminals for accepting live video chat request, according to an embodiment.

A user interface as shown in FIG. 6 might be displayed in the terminal 200 on its display 218. The interface may include the user 3's profile 271, such as a user ID "SF0002," the location 273 of the terminal 300, and any additional comments 275 from the user 3. If the user 2 is willing to have a live video cat, then he can click button 277 to start the chat. Once the request from the terminal 300 is accepted by the terminal 200, then in task S807, the device 100, the video module 107, together with the receiving module 101 and the sending module 103, will bridge a live video chat. Optionally at this moment, the attribute module 109 will keep a first count for the number of first-time video chats between any two terminals in task S809.

During the live video chat, in task S811, the timing module 111 will determine whether a first pre-set time period has elapsed since the start of the chat, if affirmative, in task S815, the video module will terminate by either stopping providing video streaming or cutting off the live video communications between the device 100 and the terminals 200 and 300. The reason of doing this is that in many real world situations, a person in a chat is often hesitant to terminate a conversation even if he really want to. Therefore having the device 100 to terminate the live video chat will relief the parties in the chat from the burden of terminating the chat. This is also important in case the users 2 and 3 are totally strangers, and they meet for the first time via the live video chat. People can experience pressure or fear when talking to a stranger for long time, e.g., more than 30 seconds, or so. Therefore, the purpose here is to keep the chat within a short period of time, e.g., less than 30 seconds. It could be as short as a few seconds, or 10, 15 or 20 seconds. When a user feels less pressure in talking to a person online face to face, he tends to use the live video chat more often.

Alternatively, the live video chat can be terminated by the terminals 200 and 300 themselves. The timing module 318 in the terminal 300 (or a similar module in the terminal 200) can track the first pre-set time period and produce a signal to the processor 312 to control the media module 308 or the requesting/receiving module 302 to terminate the chat.

Figure 7:
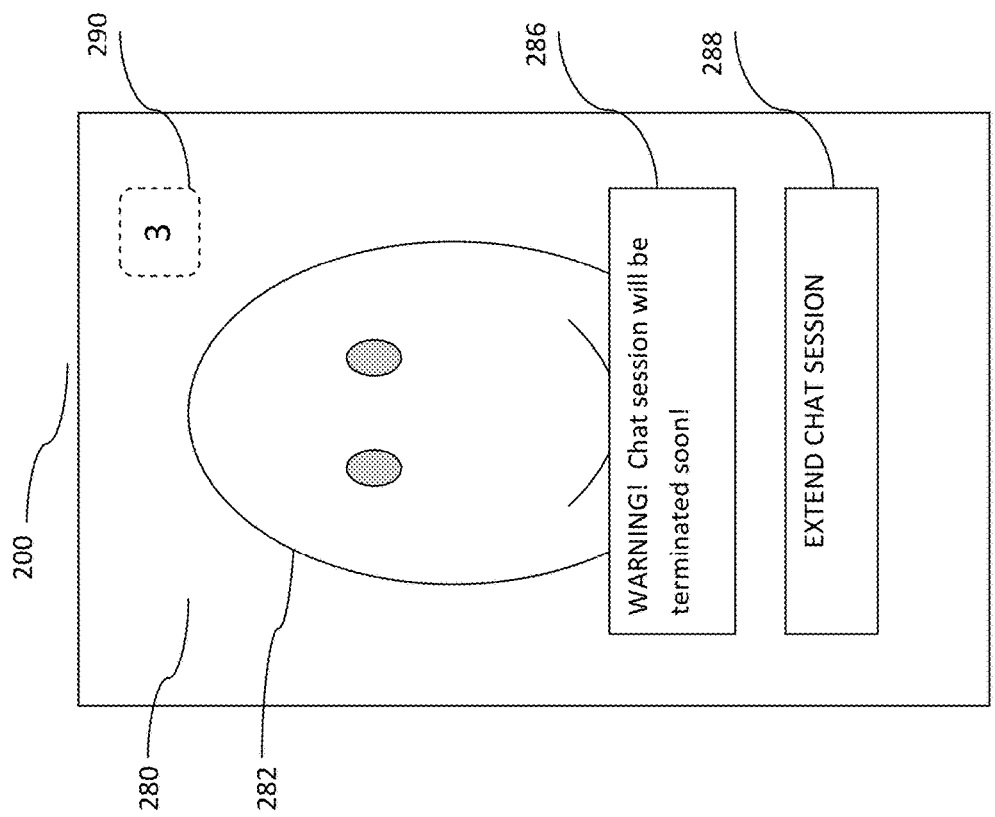
FIG. 7 is a schematic diagram showing a user interface of one of the two terminals of FIG. 1 which represents a on-going live video chat screen, in accordance with an embodiment.

In optional tasks S813 and S817, the timing module 111 may send a signal before the first pre-set time period has elapsed to let device 100 to warn the user 2, whiling watching the live image 282 of the user 3, that the chat session to going to end soon. Referring to FIG. 7, the users in the chat may see on their terminals a screen 280 showing a warning sign 286, or a count-down sign 290 to inform the users of the upcoming ending of the chat. A user with certain privilege, e.g., a paid member, may be able to extend the chat session for a certain period of time by clicking the button 288, for instance.

If a valid (such as one from a paid user) request to extend is received by the receiving module 108, the chat will be extended in tasks S819 and S821. Otherwise, the chat will be terminated as in task S815.

Figure 9:
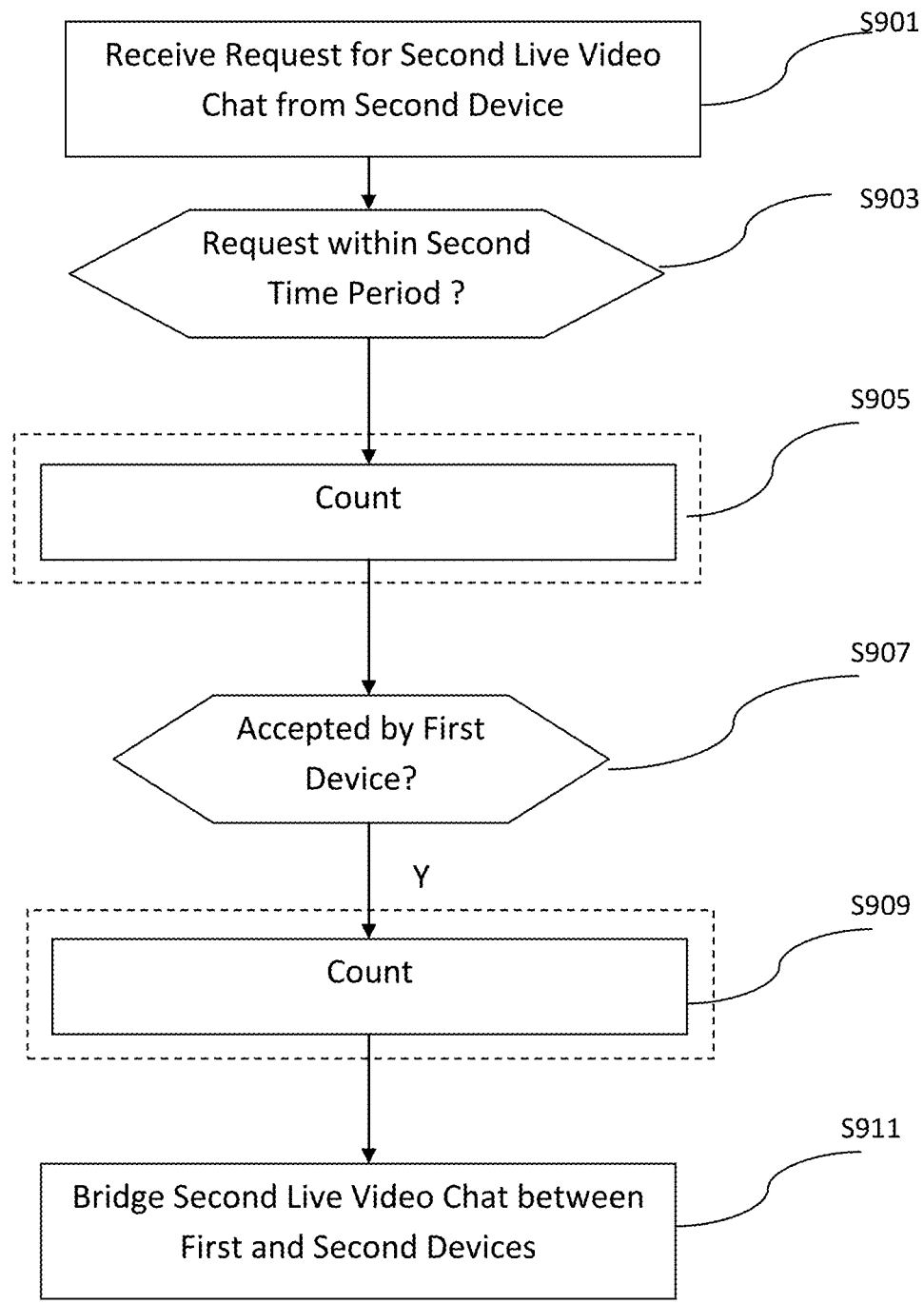
FIG. 9 is a flowchart illustrating a process in the device of FIG. 1. of conducting a second live video chat between the two terminals of FIG. 1, according to an embodiment.

If after the first live video chat, either the user 2 or the user 3 wants to have a second live chat, within a pre-set second time period, e.g., with 24 hours, or 48 hours. They can try to request a second live video chat to have a further video talk. Referring to FIG. 9, in task S901, the receiving module 103 of the device 100 receives the second request to have a second live video chat. In task S903, the timing module will determine whether this request is within the pre-set second period to be regarded as a request for the second chat. If affirmative, in task S905, the attribute module 109 may increase a second count for the user being requested for the second video chat, let's say, the user 2. If the user 2 accepted the request in task S907, a third count may be increased for the user 2 for accepting the request for the second chat. Then the device 100 can bridge the second chat. It is to be understood that, after the second chat is being bridged, the tasks of S811-S821, as in FIGS. 8A and 8B, could be performed as desired. And the second live video chat can be terminated after a third pre-set time period, which can be equal to or longer than the first pre-set time period.

Based on the three counts, the attribute module 109 cam analyze the behavior and characteristics of the users. For instance, if after the first chat, the user 3 requested a second chat, it can be inferred that the user 2 is attractive, and the user 3 is interested in the user 2. A attribute of "attractiveness" of the user 2 can be based on ratio of second count to first count, meaning: out of X number of first live video chat, the user 2 received Y number of requests for a second live video chat. This factor can be represented as a simple fraction (Y/X), or a percentage (Y/X*100%), as shown as 354 in FIG. 5, and 271 in FIG. 6, respectively. Similarly, a ratio of the value Z of the third count that the user 2 accepted the requests for a second live chat from other users to the Y number of requests for a second live video chat may indicate an attribute of "friendliness" of the user 2, and the calculations can also be displayed to other users, as shown as 354 in FIG. 5, and 271 in FIG. 6.

Figure 11:
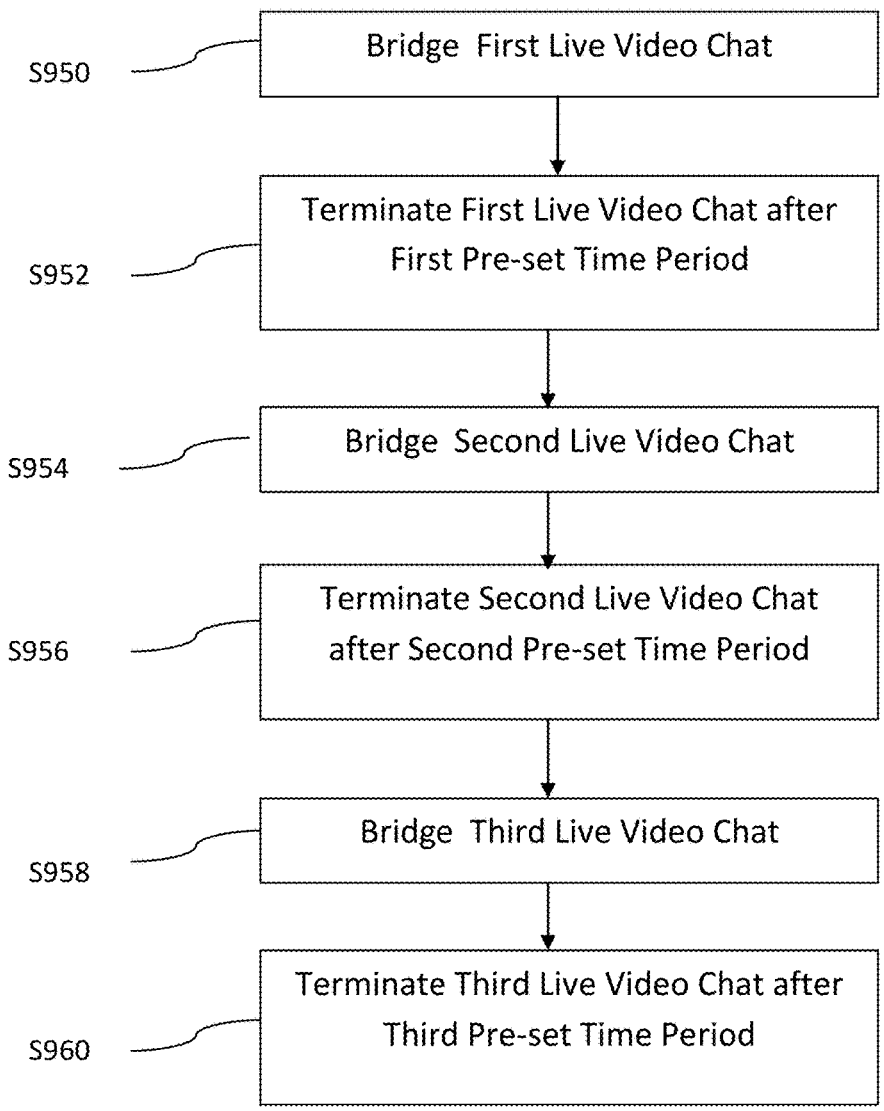
FIG. 11 is yet another flowchart showing a different embodiment of conducting a live video chat.

In case the users 2 and 3 are, at beginning, strangers, it may take more than one occasions of live video chat for them to become acquaintances or friends. FIG. 11 shows an exemplary way for conducting live video chats between the terminals 200 and 300. In task S950, the device 100 bridges the first live video chat, and then terminate the chat after the first time period, e.g., in a range of 5-10 seconds in task S952. And then the device 100 bridges the second live video chat in task S954, and terminates it after a second time period in task S956, here, the second time period may be equal to or longer than the first time period. After these two chats, the users 2 and 3 may already have an idea whether they can become friends or not. If a third live video chat does happen in task S958, as bridged by the device 100, then in task S960, the third chat could be terminated after a third pre-set time period that is longer than both the first and the second time periods. Or alternatively, the third chat could last as long as the users 2 and 3 wish, in other words, will be terminated by themselves.

While the invention has been described in terms of several exemplary embodiments, those skilled on the art will recognize that the invention can be practiced with modification within the spirit and scope of the appended claims. In addition, it is noted that, the Applicant's intent is to encompass equivalents of all claim elements, even if amended later during prosecution.

What is claimed is:

1. A method for live video chats, comprising:
   bridging a first live video chat between a user of a first terminal and a user of a second terminal by a server device which comprises one or more processors and memory storing instructions to be executed by the one or more processors to bridge live video chats, wherein the first live video chat is requested by the user of the second terminal via the server device;
   terminating the first live video chat upon a condition that a first pre-set time period has elapsed for the first live video chat;
   increasing a first count for the user of the first terminal for having the first live video chat; and
   after receiving a request from the second terminal to conduct a second live video chat by the user of the second terminal with the user of the first terminal within a second pre-set time period after the first live video chat:
      increasing a second count for the user of the first terminal for receiving the request for the second live video chat; and
      when receiving affirmative response from the first terminal, bridging the second live video chat, increasing a third count for the user of the first terminal for accepting the request for the second live video chat.

2. The method of claim 1, further comprising:
   terminating the second live video chat upon a condition that a third pre-set time period has elapsed for the second live video chat.

3. The method of claim 2, wherein the third pre-set time period is longer than the first pre-set time period.

4. The method of claim 1, further comprising:
   calculating an attribute for the first user by comparing the second count with the first count.

5. The method of claim 4, further comprising:
   presenting the attribute of the user of the first terminal on the second terminal.

6. The method of claim 1, further comprising:
   calculating an attribute for the first user by comparing the third count with the second count.

7. The method of claim 6, wherein the modules further comprises instructions for:
   presenting the attribute of the user of the first terminal on the second terminal.

8. The method of claim 1, further comprising:
   receiving position coordinates of the first terminal by the server device; and
   presenting location information of the first terminal based on the position coordinates on the second terminal.

9. The method of claim 8, wherein, when positioning information for the first terminal from a positioning system is not available, last saved position coordinates of the first terminal are used as the position coordinates for the first terminal.

10. The method of claim 8, wherein the position coordinates are selected from a pre-set location list.

11. The method of claim 8, wherein the position coordinates comprise both outdoor and indoor positioning information.

12. The method of claim 8, wherein the position coordinates comprise indoor positioning information.

13. The method of claim 8, wherein the location information is presented on a map being displayed on the second terminal.

14. A method for live video chats, comprising:
   bridging a first live video chat between a user of a first terminal and a user of a second terminal by a server device which comprises one or more processors and memory storing instructions to be executed by the one or more processors to bridge live video chats, wherein the first live video chat is requested by the user of the second terminal via the server device; and
   terminating the first live video chat upon a condition that a first pre-set time period has elapsed for the first live video chat, wherein the first pre-set time period is less than 6 seconds.

15. The method of claim 14, further comprising:
   bridging a second live video chat between the two users requested by the user of the second terminal;
   terminating the second live video chat upon a condition that a second pre-set time period has elapsed for the second live video chat, wherein the second pre-set time period ranges from 5 to 10 seconds.

16. The method of claim 15, further comprising:
   bridging a third live video chat requested by the user of the second terminal between the two users using the two terminals;
   terminating the third live video chat upon a condition that a third pre-set time period has elapsed for the third live video chat, wherein the third pre-set time period ranges from 8 to 30 seconds.

* * * * *